United States Patent
Yamazaki et al.

(10) Patent No.: US 8,919,940 B2
(45) Date of Patent: Dec. 30, 2014

(54) INK JET RECORDING APPARATUS

(75) Inventors: Soichi Yamazaki, Shiojiri (JP); Ayako Nishiki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 381 days.

(21) Appl. No.: 13/072,129

(22) Filed: Mar. 25, 2011

(65) Prior Publication Data
US 2011/0234685 A1 Sep. 29, 2011

(30) Foreign Application Priority Data
Mar. 26, 2010 (JP) ................. 2010-072408

(51) Int. Cl.
C09D 11/00 (2014.01)
C09D 11/38 (2014.01)

(52) U.S. Cl.
CPC .................. C09D 11/38 (2013.01)
USPC ........................................ 347/100

(58) Field of Classification Search
USPC ........................................ 347/100
See application file for complete search history.

(56) References Cited

U.S. PATENT DOCUMENTS

| 7,641,306 B2 | 1/2010 | Ohkuma |
| 8,246,734 B2 * | 8/2012 | Okabe et al. ............... 106/31.26 |
| 2002/0038613 A1 | 4/2002 | Yatake |
| 2002/0085048 A1 | 7/2002 | Ishinaga et al. |
| 2004/0010056 A1 * | 1/2004 | Takahashi et al. ............ 523/160 |
| 2005/0062796 A1 | 3/2005 | Mott et al. |
| 2005/0093948 A1 | 5/2005 | Morris et al. |
| 2006/0268080 A1 | 11/2006 | Nakazawa |
| 2011/0234686 A1 | 9/2011 | Yamazaki et al. |
| 2011/0234695 A1 | 9/2011 | Yamazaki et al. |

FOREIGN PATENT DOCUMENTS

| JP | 56-166274 A | 12/1981 |
| JP | 2006-159730 A | 6/2006 |
| JP | 2007-160549 A | 6/2007 |
| JP | 2008-001003 A | 1/2008 |
| JP | 2009-274418 A | 11/2009 |
| WO | WO 2009066372 A1 * | 5/2009 ............. C09D 11/16 |

OTHER PUBLICATIONS

Sakai, S., "Piezoelectric Ink Jet Printing Technique and PX Ink", Annual Meeting of Union of Chemistry-Related Societies in Chubu Area (2008), p. 75, 34.
Kanaya, M. et al., Printing Ink Course, p. 51, Japan Society of Colour Material (2007).

* cited by examiner

Primary Examiner — Laura Martin
(74) Attorney, Agent, or Firm — Nutter McClennen & Fish LLP

(57) ABSTRACT

An ink jet recording apparatus including an ink jet head for ejecting a water-based ink from a nozzle onto a recording medium, wherein the water-based ink contains a fatty acid and a fatty acid potassium or sodium salt with which the fatty acid is emulsified and dispersed in water.

4 Claims, 3 Drawing Sheets

INK JET RECORDING APPARATUS

BACKGROUND

1. Technical Field

The present invention relates to an ink jet recording apparatus.

2. Related Art

Ink jet recording apparatuses often have ink ejection failures called "nozzle-out" because of an increase in the viscosity of ink within a nozzle while the apparatus is inactive.

JP-A-2009-274418 discloses an ink jet recording apparatus in which the nozzle-out is prevented by supplying oil from an oil supply unit to a nozzle-forming surface and introducing the oil into a nozzle by oil-introducing means, thereby wetting the nozzle.

However, use of an oil tank or an oil application roller as the oil supply unit makes the wetting of the nozzle complicated and expensive.

SUMMARY

An advantage of some aspects of the invention is that it provides an ink jet recording apparatus in which nozzle-out can be simply and inexpensively prevented.

In order to solve the problems described above, an ink jet recording apparatus according to one aspect of the invention includes an ink jet head for ejecting a water-based ink from a nozzle onto a recording medium, wherein the water-based ink contains a fatty acid and a fatty acid potassium or sodium salt with which the fatty acid is emulsified and dispersed in water.

The fatty acid poorly soluble in water is emulsified with the fatty acid potassium or sodium salt and is dispersed in a solvent (water) of the water-based ink. Upon the evaporation of water in the ink at the tip of the nozzle, the fatty acid poorly soluble in water forms an oil film on the surface of the ink and retards the evaporation of water. The oil film is similar to a monomolecular film. This can prevent nozzle-out resulting from an increase in the viscosity of the ink.

Furthermore, use of the fatty acid potassium or sodium salt as a dispersant can stabilize the fatty acid dispersed in the water-based ink. Fatty acids have low solubility and dispersion stability in water and are therefore easily separated out as in a dressing containing a vegetable oil (which is mainly composed of a fatty acid). Thus, the shelf lives of inks containing fatty acids are as short as few minutes to few months. Fatty acid potassium salts and fatty acid sodium salts are compatible with both fatty acids and water. These fatty acid salts can therefore be used to emulsify and disperse fatty acids in water, thereby extending the shelf lives of inks.

It is preferable that the fatty acid has a hydrophilic lipophilic balance (HLB) value of 3 or less, and the fatty acid potassium or sodium salt has an HLB value of 12 or more.

In order to separate out the fatty acid onto the surface of an ink droplet, the fatty acid preferably has a low solubility in water, that is, high lipophilicity with an HLB value of 3 or less. In order to stably disperse the lipophilic fatty acid in ink, the fatty acid potassium or sodium salt preferably has a high solubility in water, that is, high hydrophilicity with an HLB value of 12 or more.

It is preferable that the fatty acid has a surface tension lower than the critical surface tension of cellulose at 20° C.

The surface tension of the fatty acid separated out onto the surface of the ink droplet that is lower than the critical surface tension of cellulose (paper) can facilitate the penetration of the ink into the paper.

When the surface of the ink is covered with an oil film formed of the fatty acid, the first ink droplet is ejected together with the oil film. If the surface tension of the oil film is greater than the critical surface tension of paper, the paper remains wet with the ink. This may cause the adhesion of the ink to a paper feed roller or a hand.

To avoid this, the fatty acid separated out onto the surface of an ink droplet has a surface tension lower than the critical surface tension of paper, thereby facilitating the penetration of the fatty acid into the paper. This facilitates the penetration of the ink into the paper.

It is preferable that the fatty acid is oleic acid.

Oleic acid has high oxidative stability and is liquid at normal temperature. Many unsaturated fatty acids have two or more double bonds and are easily oxidized by the abstraction of a methylene hydrogen between double bonds. Oleic acid, which is an unsaturated fatty acid having one double bond, has no methylene hydrogen and therefore has much higher oxidative stability than unsaturated fatty acids having two or more double bonds. Saturated fatty acids having no double bond have still higher oxidative stability. However, most of oxidatively stable saturated fatty acids are solid at normal temperature and are not suitable for use in ink. Thus, the fatty acid is preferably oleic acid, which is liquid at normal temperature.

It is preferable that the water-based ink contains 0.05% by weight or more and 3.00% by weight or less oleic acid as the fatty acid, and 0.05% by weight or more and 3.00% by weight or less of the fatty acid potassium or sodium salt.

Less than 0.05% by weight oleic acid cannot sufficiently retard the drying of the ink. More than 3.00% by weight oleic acid results in low dispersion stability and adversely affects the retardation of the drying of the ink.

Less than 0.05% by weight of the fatty acid potassium or sodium salt results in low dispersion stability of oleic acid and adversely affects the retardation of the drying of the ink. More than 3.00% by weight of the fatty acid potassium or sodium salt results in an unstable oil film of oleic acid and insufficient retardation of the drying of the ink.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
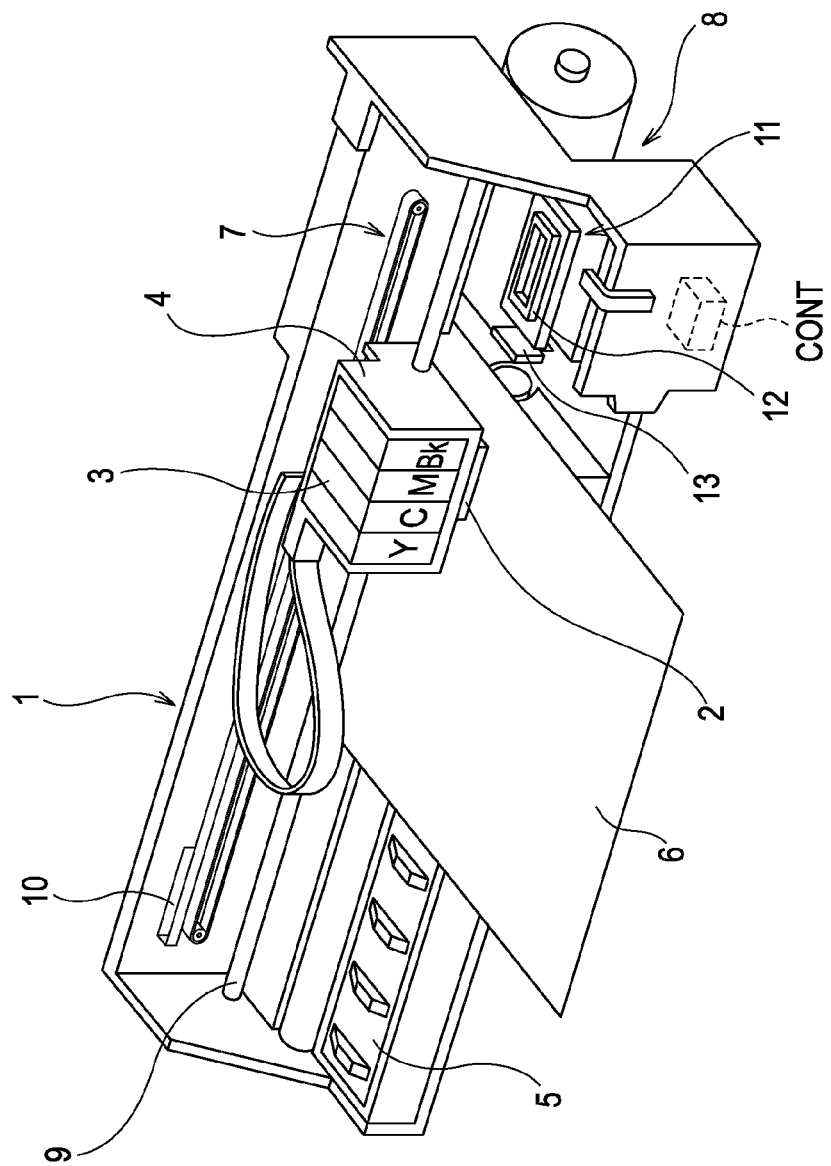
FIG. 1 is a perspective view of a printer according to an embodiment of the invention.

Ink jet recording apparatuses according to embodiments of the invention will be described below with reference to the drawings. In the drawings, the sizes of components are appropriately altered for the sake of clarity. An ink jet printer (hereinafter referred to simply as a printer) is exemplified as an ink jet recording apparatus according to an embodiment of the invention.

FIG. 1 is a perspective view of a printer 1 according to an embodiment of the invention.

The printer 1 includes a recording head (ink jet head) 2, a carriage 4 in which an ink cartridge 3 is removably mounted, a platen 5 for transporting a recording paper sheet (recording medium) 6 disposed below the recording head 2, a carriage drive mechanism 7 for moving the carriage 4 in the width direction of the recording paper sheet 6, and a paper feed mechanism 8 for transporting the recording paper sheet 6 in a paper feed direction. The printer 1 further includes a controller CONT for controlling the operation of the printer 1. The paper width direction is the main scanning direction (the head scanning direction). The paper feed direction is a sub-scanning direction (a direction perpendicular to the main scanning direction).

Although the ink cartridge 3 is mounted in the carriage 4 in the present embodiment, the ink cartridge 3 may be mounted on a housing of the printer 1 and supply the ink to the recording head 2 through an ink supply tube. The ink cartridge 3 contains different color inks, such as yellow (Y), magenta (M), cyan (C), and black (Bk).

A guide rod 9 is a supporting member disposed in the main scanning direction. The guide rod 9 supports the carriage 4. The carriage drive mechanism 7 can move the carriage 4 along the guide rod 9 in the main scanning direction. A linear encoder 10 can determine the position of the carriage 4 in the main scanning direction. This position information is sent to the controller CONT. The controller CONT can determine the scanning position of the recording head 2 from the position information of the linear encoder 10 and control the recording operation (discharging operation) of the recording head 2. The controller CONT can control the moving speed of the carriage 4.

Figure 2:
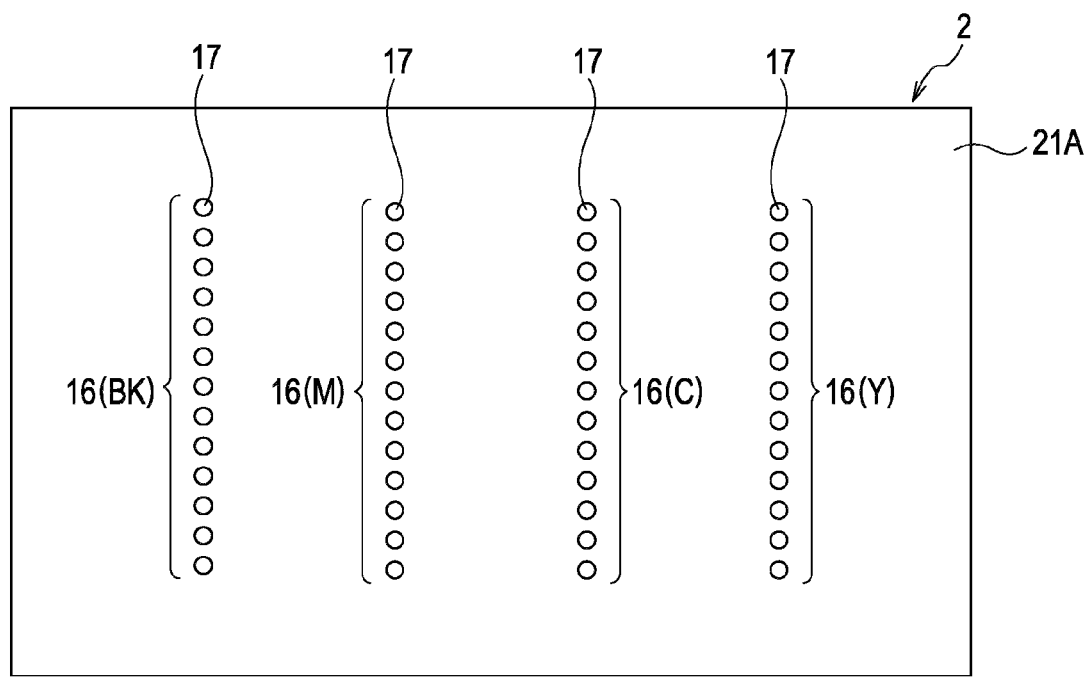
FIG. 2 is a schematic view of the arrangement of nozzles in a recording head according to an embodiment of the invention.

FIG. 2 is a schematic view of the arrangement of nozzles 17 in a recording head 2 according to an embodiment of the invention.

The recording head 2 has a nozzle-forming surface (ejection surface) 21A in which a plurality of nozzles 17 for ejecting inks are disposed. The nozzles 17 constitute nozzle arrays 16 on the nozzle-forming surface 21A. Each of the nozzle arrays 16 can eject a different color ink. In the present embodiment, four nozzle arrays 16 (16(Bk), 16(M), 16(C), and 16(Y)) correspond to four ink colors. For example, each of the nozzle arrays 16 includes 180 nozzles 17.

Figure 3:
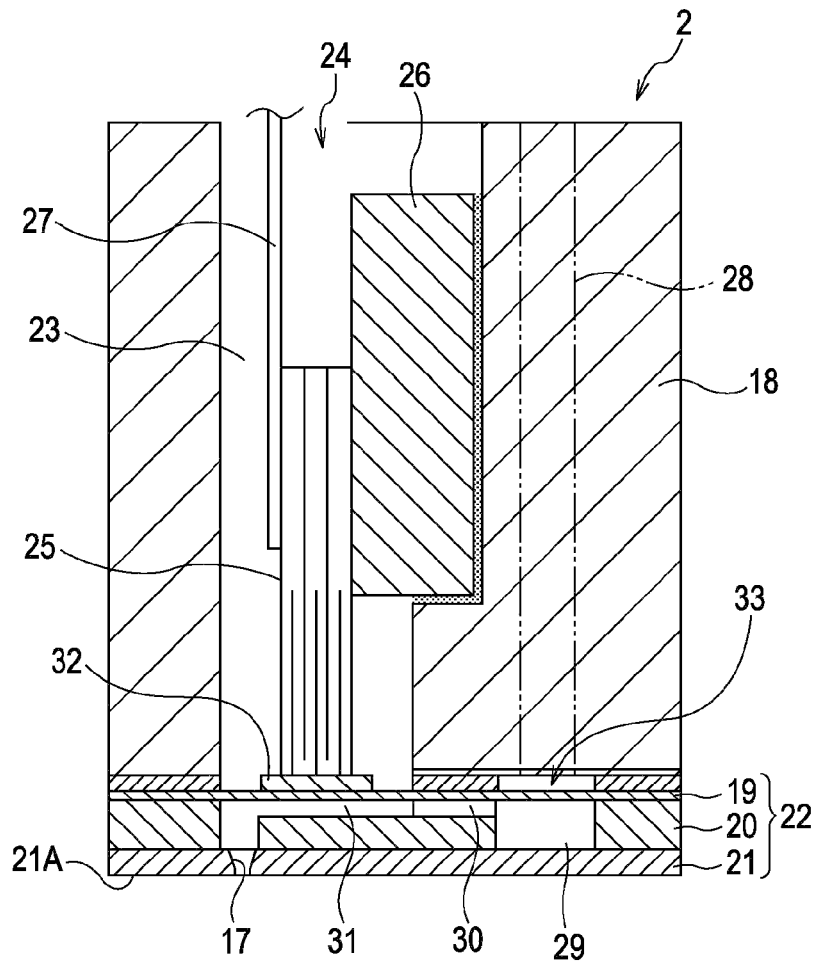
FIG. 3 is a fragmentary sectional view of a recording head according to an embodiment of the invention.

FIG. 3 is a fragmentary sectional view of a recording head 2 according to an embodiment of the invention.

The recording head 2 includes a head main body 18 and a flow-path-forming unit 22 attached to the head main body 18. The flow-path-forming unit 22 includes a diaphragm 19, a flow path substrate 20, a nozzle substrate 21, a common ink chamber 29, an ink supply port (outlet) 30, and a pressure chamber 31. The flow-path-forming unit 22 further includes an island portion 32, which functions as a diaphragm, and a compliance portion 33 for accommodating variations in the pressure of the common ink chamber 29. The head main body 18 includes a housing space 23, which houses a fixing member 26 and a drive unit 24, and an inner flow path 28 for guiding an ink to the flow-path-forming unit 22.

The recording head 2 is a piezoelectric recording head. A piezoelectric element 25 can expand and contract in response to drive signals input from the drive unit 24 through a cable 27. The expansion and contraction deform (move) the diaphragm 19 closer to and away from the nozzle substrate 21. This alters the volume and consequently the pressure of the pressure chamber 31 containing the ink. These variations in pressure allow the ink to be ejected from the nozzles 17.

Referring back to FIG. 1, the scanning start position or the home position of the recording head 2 is located outside the platen 5. A maintenance unit 11 is disposed at the home position. The maintenance unit 11 can perform a wetting operation, a flushing operation, a suction operation (head cleaning), and a wiping operation. In the wetting operation, while the apparatus is inactive, the recording head 2 is sealed with a cap member 12 to prevent the drying of an ink. In the flushing operation, preliminary ejection of the ink from the nozzles 17 of the recording head 2 onto the cap member 12 can prevent the clogging of the nozzles 17 with thickened ink and adjust the meniscuses in the nozzles 17, thereby ensuring normal ejection of the ink from the recording head 2. In the suction operation (head cleaning), after the recording head 2 is sealed with the cap member 12, thickened ink and contaminants in the nozzles 17 are removed with a suction pump (not shown) to adjust the meniscuses, thereby ensuring normal ejection of the ink from the recording head 2. In the wiping operation, the nozzle-forming surface 21A of the recording head 2 is wiped with a wiping member 13 to remove ink deposited on the neighborhood of the nozzles 17 and thickened ink. The wiping operation also involves purging in which the meniscuses of the nozzles 17 are destroyed and readjusted.

The ink ejected from the recording head 2 will be described below.

An ink according to the present embodiment is a type of superpenetrating water-based ink. The superpenetrating water-based ink may be not only a pigment ink or a dye ink but also a functional water-based ink containing a dye, metal fine particles, ceramic fine particles, semiconductor fine particles, or a resin. The term "superpenetrating" in the context of ink means that the surface tension is lower than the critical surface tension of cellulose (paper).

The water-based ink may contain various additives. Examples of the additives include surfactants, humectants, pH-adjusting agents, pigments, dyes, coloring matter, metal fine particles, ceramic fine particles, semiconductor fine particles, resins, organic solvents, metal ions, anti-curling agents, anti-breeding agents, anti-puddling agents, penetration modifiers, preservatives, fungicides, dissolution aids, and antioxidants. These additives are preferably used in combination depending on the application.

A fatty acid and a fatty acid potassium or sodium salt are added to the water-based ink to produce an ink according to the present embodiment.

The fatty acid for use in the ink according to the present embodiment has a surface tension lower than the critical surface tension of cellulose (paper) and lipophilicity with an HLB value of three or less. Since the critical surface tension of cellulose at 20° C. ranges from 40 to 45 mN/m, the fatty acid preferably has a surface tension of less than 40 mN/m. The fatty acid is preferably liquid at normal temperature so that the fatty acid separated out does not become solid.

In the strict sense, the HLB value, a measure of hydrophilicity or lipophilicity, varies with measurement methods, such as an Atlas method and a PIT method. However their differences are insignificant. An HLB value of 3 or less as determined by any measurement method is indicative of lipophilic. The fatty acid for use in the ink according to the present embodiment has an HLB value of three or less as determined by one of such measurement methods.

Examples of the fatty acid satisfying such conditions include oleic acid, linoleic acid, and linolenic acid. In terms of oxidative stability, the fatty acid is preferably oleic acid. Oleic acid may be purified or a vegetable oil mainly composed of oleic acid, such as olive oil. Oleic acid has a surface tension of 35 mN/m and an HLB value of 1.

A fatty acid potassium salt or a fatty acid sodium salt for use in the ink according to the present embodiment has high hydrophilicity with an HLB value of 12 or more.

It is difficult to stably disperse a lipophilic fatty acid alone in water or water-based ink. The addition of a hydrophilic fatty acid potassium or sodium salt allows the stable dispersion of a lipophilic fatty acid emulsified. Thus, the amount of fatty acid in the ink can be greatly increased.

Provided that the conditions described above are satisfied, the fatty acid potassium or sodium salt and the fatty acid may be initially added in the manufacture of the ink or may be added later to an existing superpenetrating water-based dye ink, water-based pigment ink, or functional water-based ink. The later addition is preferred because it does not disturb the entire balance of the ink, obviates the necessity of redesigning, or can prevent nozzle-out associated with an increase in the viscosity of the ink.

Since the printer 1 according to the present embodiment employs an ink containing a fatty acid, a piezoelectric ink jet head is preferably used because of a small possibility of the thermal oxidation of the fatty acid. Although a thermal ink jet head may be used for an ink containing a small amount of fatty acid, a piezoelectric ink jet head is preferably used because of a small possibility of nozzle clogging resulting from the oxidation of the fatty acid.

The operation and effect related to the prevention of nozzle-out in the printer 1 will be described below with reference to FIG. 4.

Figure 4:
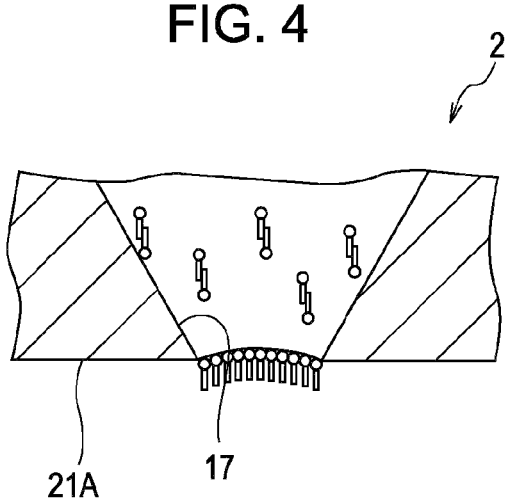
FIG. 4 is a schematic view of a nozzle according to an embodiment of the invention.

FIG. 4 is a schematic view of a nozzle 17 according to an embodiment of the invention.

A water-based ink containing oleic acid as the fatty acid and potassium oleate as the fatty acid potassium salt is used in this embodiment.

An ink according to the present embodiment is prepared by emulsifying lipophilic oleic acid using hydrophilic potassium oleate as a dispersant and dispersing the emulsion in a solvent (water) of a water-based ink. Upon the evaporation of water in the ink at an open end of the nozzle 17, oleic acid forms an oil film on the surface of the ink and retards the evaporation of water. The oil film is similar to a monomolecular film. This can prevent nozzle-out resulting from an increase in the viscosity of the ink.

For example, in continuous printing on 100 sheets using a magenta ink in the first and 100th printing and another ink in the second to 99th printing, a magenta nozzle may be dried after the first printing, and the landing accuracy of the magenta ink in the 100th printing may be markedly decreased, resulting in poor image quality. Such a failure can be avoided with the ink according to the present embodiment.

Oleic acid used as the fatty acid in the present embodiment has a surface tension lower than the critical surface tension of cellulose at 20° C. When the surface of the ink is covered with an oil film of oleic acid separated out, the first ink droplet is ejected together with the oil film. After landing on the recording paper sheet 6, oleic acid separated out onto the surface of the ink droplet rapidly penetrates cellulose. Thus, the surface tension of the whole ink is predominant and ensures the superpenetration and quick-drying of the ink. When the second and later ink droplets are ejected, an oil film is not formed and therefore does not prevent the penetration and evaporation of the ink.

Thus, the printer 1 according to the present embodiment can simply and inexpensively produce high-quality images without nozzle-out.

Examples

The advantages of the invention will be further described with reference to the examples. The invention is not limited to these examples, and various modifications may be made in it without departing from the gist of the present invention.

Method for Manufacturing Pigment Ink

PX ink manufactured by Seiko Epson Co. described in a literature (Shinri SAKAI, "Piezo-housiki Inkujetto Purintingu Gijutsu To PX Ink (Piezoelectric Ink Jet Printing Technique and PX Ink)", Chubu Kagaku-kankei Gakukyoukaishibu-rengou Shuki Taikai Kouen Yokoushu, p. 75, 34, (2008)) was used with a modification.

The PX ink is also described in another literature (Japan Society of Colour Material, Miharu KANAYA, et al., "Insatsu Inki Kouza (Printing Ink Course)", p. 51, Japan Society of Colour Material (2007)).

Oleic acid, potassium oleate, and pure water were mixed at a ratio of 2:3:5 by agitation and ultrasonic dispersion to prepare oleic acid dispersion liquid. Two percent by weight of the dispersion liquid was added to a water-based black pigment ink used in a printer PX-B500 manufactured by Seiko Epson Co. and was subjected to agitation and ultrasonic dispersion. The pure water in the oleic acid dispersion liquid allows the formation of a stable micellar structure of oleic acid in water before the oleic acid dispersion liquid was added to the ink and improves the dispersion stability of oleic acid in the ink.

The ink of PX-B500 (hereinafter also referred to as a PX ink) had a surface tension of 27 mN/m. The ink containing oleic acid (hereinafter also referred to as a modified PX ink) had a surface tension of 28 mN/m.

Method for Determining Drying of Ink on Nozzle Surface

A black ink cartridge of the printer PX-B500 manufactured by Seiko Epson Co. was filled with the modified ink and was ready for printing. The printer PX-B500 manufactured by Seiko Epson Co. was modified so that the head could be stopped at the center and opened to the atmosphere. After performing the head cleaning function of the PX-B500 and solid printing on an A4-size sheet, the number of nozzles having nozzle-out was confirmed to be zero using a nozzle-out checking pattern. After the printer was left to stand in the atmosphere for two hours, the number of nozzles having nozzle-out was measured using the nozzle-out checking pattern.

Method for Determining Drying of Ink on Paper

After performing the head cleaning function of the PX-B500 and solid printing on an A4-size paper sheet, the weight of the sheet was measured 5 and 100 seconds after printing. The drying of ink expressed in % by weight was determined from the difference between these weights.

Table 1 shows the compositions of inks, the drying of ink on a nozzle surface (the number of nozzles having nozzle-out), and the ink-drying speed on a paper sheet (the drying of ink expressed in % by weight).

In Example 1, the modified PX ink manufactured by the ink manufacturing procedures described above was tested by the method for determining the drying of ink on a nozzle surface and the method for determining the drying of ink on a paper sheet.

Inks according to Comparative Examples 1 to 4 were manufactured by the ink manufacturing procedures described in Example 1 except that the composition was altered as shown in Table 1. The method for determining the drying of ink on a nozzle surface and the method for determining the drying of ink on a paper sheet described in Example 1 were performed.

In Example 2, the modified PX ink (magenta) manufactured by the ink manufacturing procedures described above was tested by the method for determining the drying of ink on a nozzle surface and the method for determining the drying of ink on a paper sheet.

In Example 3, the modified PX ink (cyan) manufactured by the ink manufacturing procedures described above was tested by the method for determining the drying of ink on a nozzle surface and the method for determining the drying of ink on a paper sheet.

In Example 4, the modified PX ink (yellow) manufactured by the ink manufacturing procedures described above was tested by the method for determining the drying of ink on a nozzle surface and the method for determining the drying of ink on a paper sheet.

alone had a little effect on the drying of ink on a nozzle surface. Table 1 also shows that a combination of oleic acid and potassium oleate effectively retarded the drying of ink on a nozzle surface in the color inks, as well as the black ink.

Table 2 shows the compositions of inks, the drying of ink on a nozzle surface (the number of nozzles having nozzle-out), and the ink-drying speed on a paper sheet (the drying of ink expressed in % by weight).

Modified PX inks according to Comparative Examples 5 to 12 and Examples 5 to 14 had different ratios of oleic acid to

TABLE 1

|  | Composition of ink | | | | Ink drying on nozzle surface Number of nozzles having nozzle-out after | Ink-drying speed on paper Weights at 5 and 100 s after |
|---|---|---|---|---|---|---|
|  | Ink of PX-B500 | Oleic acid | Potassium oleate | Pure Water | exposure to air for 3 h | A4-size solid printing |
| Example 1 | 98 wt % | 0.4 wt % | 0.6 wt % | 1 wt % | 0 | 30% |
| Comparative example 1 | 98 wt % | 0.4 wt % | — | 1 wt % | 12 | 20% |
| Comparative example 2 | 98 wt % | — | 0.6 wt % | 1 wt % | 20 | 25% |
| Comparative example 3 | 98 wt % | — | — | 1 wt % | 26 | 29% |
| Comparative example 4 | 100 wt % | — | — | — | 24 | 28% |
| Example 2 | 98 wt % | 0.4 wt % | 0.6 wt % | 1 wt % | 0 | 30% |
| Example 3 | 98 wt % | 0.4 wt % | 0.6 wt % | 1 wt % | 0 | 30% |
| Example 4 | 98 wt % | 0.4 wt % | 0.6 wt % | 1 wt % | 0 | 30% |

Table 1 shows that a combination of oleic acid and potassium oleate retarded the drying of ink on a nozzle surface. Table 1 also shows that oleic acid had little effect on the ink-drying speed. Table 1 also shows that potassium oleate potassium oleate. These modified PX inks were tested by the method for determining the drying of ink on a nozzle surface and the method for determining the drying of ink on a paper sheet described in Example 1.

TABLE 2

|  | Composition of ink | | | | Ink drying on nozzle surface Number of nozzles having nozzle-out after | Ink-drying speed on paper Weights at 5 and 100 s after |
|---|---|---|---|---|---|---|
|  | Ink of PX-B500 | Oleic acid | Potassium oleate | Pure Water | exposure to air for 3 h | A4-size solid printing |
| Comparative example 5 | 98.39 wt % | 0.01 wt % | 0.6 wt % | 1 wt % | 15 | 30% |
| Comparative example 6 | 98.37 wt % | 0.03 wt % | 0.6 wt % | 1 wt % | 10 | 31% |
| Example 5 | 98.35 wt % | 0.05 wt % | 0.6 wt % | 1 wt % | 2 | 30% |
| Example 6 | 98.3 wt % | 0.1 wt % | 0.6 wt % | 1 wt % | 0 | 29% |
| Example 7 | 97.9 wt % | 0.5 wt % | 0.6 wt % | 1 wt % | 0 | 30% |
| Example 8 | 97.4 wt % | 1 wt % | 0.6 wt % | 1 wt % | 0 | 29% |
| Example 9 | 96.4 wt % | 2 wt % | 0.6 wt % | 1 wt % | 0 | 28% |
| Example 10 | 95.4 wt % | 3 wt % | 0.6 wt % | 1 wt % | 0 | 30% |
| Comparative example 7 | 94.4 wt % | 4 wt % | 0.6 wt % | 1 wt % | 5 | 30% |
| Comparative example 8 | 93.4 wt % | 5 wt % | 0.6 wt % | 1 wt % | 5 | 30% |
| Comparative example 9 | 98.93 wt % | 0.02 wt % | 0.05 wt % | 1 wt % | 12 | 29% |
| Example 11 | 98.9 wt % | 0.05 wt % | 0.05 wt % | 1 wt % | 2 | 28% |
| Example 12 | 95.95 wt % | 3 wt % | 0.05 wt % | 1 wt % | 0 | 31% |
| Comparative example 10 | 93.95 wt % | 5 wt % | 0.05 wt % | 1 wt % | 6 | 29% |
| Comparative example 11 | 95.98 wt % | 0.02 wt % | 3 wt % | 1 wt % | 12 | 30% |

TABLE 2-continued

| | Composition of ink | | | Ink drying on nozzle surface Number of nozzles having nozzle-out after exposure to air for 3 h | Ink-drying speed on paper Weights at 5 and 100 s after A4-size solid printing |
|---|---|---|---|---|---|
| | Ink of PX-B500 | Oleic acid | Potassium oleate | Pure Water | | |
| Example 13 | 95.95 wt % | 0.05 wt % | 3 wt % | 1 wt % | 2 | 29% |
| Example 14 | 93 wt % | 3 wt % | 3 wt % | 1 wt % | 0 | 28% |
| Comparative example 12 | 91 wt % | 5 wt % | 3 wt % | 1 wt % | 5 | 30% |

Table 2 shows that less than 0.05% by weight oleic acid could not effectively retard the drying of ink on a nozzle surface. Table 2 also shows that more than 3% by weight oleic acid resulted in low dispersion stability and adversely affected the retardation of the drying of ink on a nozzle surface.

Table 3 shows the compositions of inks, the drying of ink on a nozzle surface (the number of nozzles having nozzle-out), and the ink-drying speed on a paper sheet (the drying of ink expressed in % by weight).

Modified PX inks according to Comparative Examples 13 to 20 and Examples 15 to 24 had different ratios of oleic acid to potassium oleate. These modified PX inks were tested by the method for determining the drying of ink on a nozzle surface and the method for determining the drying of ink on a paper sheet described in Example 1.

nozzle surface. Table 3 also shows that more than 3% by weight potassium oleate resulted in an unstable oil film of oleic acid and insufficient retardation of the drying of ink on a nozzle surface.

Table 4 shows the compositions of inks, the drying of ink on a nozzle surface (the number of nozzles having nozzle-out), and the ink-drying speed on a paper sheet (the drying of ink expressed in % by weight).

In Example 25, the PX ink was replaced with a water-based dye ink for use in a printer EP-802A manufactured by Seiko Epson Co.

Method for Manufacturing Dye Ink

Oleic acid, potassium oleate, and pure water were mixed at a ratio of 2:3:5 by agitation and ultrasonic dispersion to prepare oleic acid dispersion liquid. Two percent by weight of the

TABLE 3

| | Composition of ink | | | | Ink drying on nozzle surface Number of nozzles having nozzle-out after exposure to air for 3 h | Ink-drying speed on paper Weights at 5 and 100 s after A4-size solid printing |
|---|---|---|---|---|---|---|
| | Ink of PX-B500 | Oleic acid | Potassium oleate | Pure Water | | |
| Comparative example 13 | 98.59 wt % | 0.4 wt % | 0.01 wt % | 1 wt % | 5 | 29% |
| Comparative example 14 | 98.57 wt % | 0.4 wt % | 0.03 wt % | 1 wt % | 5 | 30% |
| Example 15 | 98.55 wt % | 0.4 wt % | 0.05 wt % | 1 wt % | 2 | 28% |
| Example 16 | 98.5 wt % | 0.4 wt % | 0.1 wt % | 1 wt % | 0 | 32% |
| Example 17 | 98.1 wt % | 0.4 wt % | 0.5 wt % | 1 wt % | 0 | 28% |
| Example 18 | 97.6 wt % | 0.4 wt % | 1 wt % | 1 wt % | 0 | 29% |
| Example 19 | 96.6 wt % | 0.4 wt % | 2 wt % | 1 wt % | 0 | 30% |
| Example 20 | 95.6 wt % | 0.4 wt % | 3 wt % | 1 wt % | 0 | 32% |
| Comparative example 15 | 94.6 wt % | 0.4 wt % | 4 wt % | 1 wt % | 3 | 29% |
| Comparative example 16 | 93.6 wt % | 0.4 wt % | 5 wt % | 1 wt % | 10 | 30% |
| Comparative example 17 | 98.93 wt % | 0.05 wt % | 0.02 wt % | 1 wt % | 12 | 31% |
| Example 21 | 98.9 wt % | 0.05 wt % | 0.05 wt % | 1 wt % | 2 | 28% |
| Example 22 | 95.95 wt % | 0.05 wt % | 3 wt % | 1 wt % | 2 | 29% |
| Comparative example 18 | 93.95 wt % | 0.05 wt % | 5 wt % | 1 wt % | 11 | 28% |
| Comparative example 19 | 95.98 wt % | 3 wt % | 0.02 wt % | 1 wt % | 6 | 30% |
| Example 23 | 95.95 wt % | 3 wt % | 0.05 wt % | 1 wt % | 0 | 31% |
| Example 24 | 93 wt % | 3 wt % | 3 wt % | 1 wt % | 0 | 28% |
| Comparative example 20 | 91 wt % | 3 wt % | 5 wt % | 1 wt % | 6 | 31% |

Table 3 shows that less than 0.05% by weight potassium oleate resulted in low dispersion stability of oleic acid and adversely affected the retardation of the drying of ink on a dispersion liquid was added to a water-based dye ink for use in a printer EP-802A manufactured by Seiko Epson Co. and was subjected to agitation and ultrasonic dispersion.

In Example 25, an ink cartridge of the modified printer PX-B500 was filled with the modified ink. The method for determining the drying of ink on a nozzle surface and the method for determining the drying of ink on a paper sheet described in Example 1 were performed.

In Comparative Example 21, an ink cartridge of the modified printer PX-B500 was filled with the water-based dye ink for use in the printer EP-802A manufactured by Seiko Epson Co. The method for determining the drying of ink on a nozzle surface and the method for determining the drying of ink on a paper sheet described in Example 1 were performed.

TABLE 4

| | Composition of ink | | | | Ink drying on nozzle surface Number of nozzles having nozzle-out after exposure to air for 3 h | Ink-drying speed on paper Weights at 5 and 100 s after A4-size solid printing |
|---|---|---|---|---|---|---|
| | Ink of EP-802A | Oleic acid | Potassium oleate | Pure Water | | |
| Example 25 | 98 wt % | 0.4 wt % | 0.6 wt % | 1 wt % | 0 | 33% |
| Comparative example 21 | 100 wt % | — | — | — | 12 | 34% |

Table 4 shows that a combination of oleic acid and potassium oleate effectively retarded the drying of ink on a nozzle surface also with the dye water-based ink.

Table 5 shows the compositions of inks, the drying of ink on a nozzle surface (the number of nozzles having nozzle-out), and the ink-drying speed on a paper sheet (the drying of ink expressed in % by weight).

In Example 26, potassium oleate was replaced with sodium oleate. The method for determining the drying of ink on a nozzle surface and the method for determining the drying of ink on a paper sheet described in Example 1 were performed.

In Comparative Examples 22 to 25, oleic acid in Example 1 was replaced with sodium oleate, oleyl alcohol, ethyl oleate, or sorbitan trioleate, respectively. The method for determining the drying of ink on a nozzle surface and the method for determining the drying of ink on a paper sheet described in Example 1 were performed.

Table 5 shows that a combination of oleic acid and potassium oleate and a combination of oleic acid and sodium oleate were most effective.

Thus, the simultaneous addition of a fatty acid and a fatty acid potassium or sodium salt to a water-based ink has the following synergistic effects.

(1) Dispersion Stabilization of Lipophilic Fatty Acid

The addition of a hydrophilic fatty acid potassium or sodium salt can stabilize the dispersion of a lipophilic fatty acid, which alone cannot be stably dispersed in water or ink.

A hydrophilic fatty acid potassium or sodium salt alone cannot form an oil film on the surface of ink. The formation of the oil film requires the addition of a lipophilic fatty acid. However, the lipophilic fatty acid is poorly soluble in water. Thus, the simultaneous addition of the lipophilic fatty acid and the hydrophilic fatty acid potassium or sodium salt can synergistically achieve the oil film formation and stable dispersion.

(2) Type of Evaporation-Retarding Film and Appropriate Film-Forming Speed

Various components of an ink, such as a polymer, a surfactant, and a pigment, can form a film upon the evaporation of water. The formation of a film of a solid component may increase ink-ejection resistance and affect landing accuracy. A liquid film of a fatty acid has a high evaporation-retarding effect and a low ink-ejection resistance.

TABLE 5

| | | Composition of ink | | | Ink drying on nozzle surface Number of nozzles having nozzle-out after exposure to air for 3 h | Ink-drying speed on paper Weights at 5 and 100 s after A4-size solid printing |
|---|---|---|---|---|---|---|
| Amount added | 98 wt % | 0.4 wt % | 0.6 wt % | 1 wt % | | |
| Example 1 | Ink of PX-B500 | Oleic acid | Potassium oleate | Pure Water | 0 | 30% |
| Example 26 | Ink of PX-B500 | Oleic acid | Sodium oleate | Pure Water | 0 | 31% |
| Comparative example 22 | Ink of PX-B500 | Sodium oleate | Potassium oleate | Pure Water | 18 | 29% |
| Comparative example 23 | Ink of PX-B500 | Oleyl alcohol | Potassium oleate | Pure Water | 12 | 25% |
| Comparative example 24 | Ink of PX-B500 | Ethyl oleate | Potassium oleate | Pure Water | 13 | 26% |
| Comparative example 25 | Ink of PX-B500 | Sorbitan trioleate | Potassium oleate | Pure Water | 24 | 24% |

Table 5 shows that sodium oleate used in place of potassium oleate also retarded the drying of ink on a nozzle surface.

It is presumed that the film formation associated with the evaporation of water involves not only one component but a plurality of components, such as a fatty acid, a polymer, a surfactant, and a pigment. It was found in the invention that the simultaneous addition of a lipophilic fatty acid and a hydrophilic fatty acid potassium or sodium salt can achieve the speed of formation of a fatty acid oil film suitable to produce a high evaporation-retarding effect without affecting the ejection of ink.

(3) Retardation of Evaporation During Quiescent Operation and Reduction in Amount of Maintenance Ink In an ink jet recording apparatus, ink evaporates from a nozzle surface. Flushing and cleaning of the nozzle surface consume a maintenance ink.

In accordance with the invention, like existing mechanical rubber caps, chemical capping of the nozzles while the apparatus is inactive can greatly reduce the amount of maintenance ink in flushing and cleaning.

(4) Oxidative Stability of Fatty Acid

Many unsaturated fatty acids are easily oxidized. This is because many unsaturated fatty acids have two or more double bonds and are easily oxidized by the abstraction of a methylene hydrogen between double bonds. Such unsaturated fatty acids include linoleic acid and linolenic acid. Unsaturated fatty acids having one double bond have no methylene hydrogen and therefore have much higher oxidative stability than unsaturated fatty acids having two or more double bonds. Such unsaturated fatty acids include oleic acid. Saturated fatty acids having no double bond have still higher oxidative stability.

(5) Melting Point of Fatty Acid

A liquid fatty acid separated out onto a nozzle surface has a reduced probability of causing nozzle clogging. Fatty acids that have one or less double bond and are liquid at normal temperature include oleic acid. Most of oxidatively stable saturated fatty acids are solid at normal temperature and are not suitable for use in ink. Thus, the fatty acid is preferably oleic acid.

(6) Fatty Acid Potassium Salt or Fatty Acid Sodium Salt

For stable dispersion of a fatty acid in ink (in water), the fatty acid is desirably a metallic soap of a monovalent metal ion. A large amount of divalent ion may cause precipitation. The simultaneous dissolution or dispersion of a fatty acid and a metal salt of the same fatty acid has a synergistic effect of an increase in the amount of fatty acid and stable dispersion. In particular, the simultaneous addition of oleic acid and potassium oleate or sodium oleate has a large effect.

(7) Superpenetrating Ink

After an ink droplet lands on a print medium, a fatty acid having a high affinity for paper is absorbed in paper and does not prevent the penetration of the ink and evaporation of water. In particular, a superpenetrating ink rapidly spreads over and penetrates a paper sheet. Thus, water and a fatty acid are rapidly absorbed into paper and do not prevent evaporation. A fatty acid can therefore retard evaporation on a nozzle surface and does not prevent penetration and evaporation on paper.

(8) Advantage Over Evaporation-Retarding Effect of Mechanical Rubber Cap

Even when an ink jet recording apparatus is left to stand for several months to several years, in addition to the evaporation-retarding effect of an existing mechanical rubber cap, the evaporation-retarding effect of chemical capping with a fatty acid can improve long-term storage stability.

Thus, the invention can simply and inexpensively produce high-quality images without nozzle-out.

What is claimed is:

1. An ink jet recording device comprising:
an ink jet head for ejecting a water-based ink from a nozzle onto a recording medium,
wherein the water-based ink contains a fatty acid and a fatty acid sodium salt and wherein the water-based ink contains between 0.05% and 3.00% by weight oleic acid as the fatty acid, between 0.05% and 3.00% by weight of the fatty acid sodium salt, and greater than 50% by weight water.

2. The ink jet apparatus according to claim 1, wherein the fatty acid has an HLB value of 3 or less, and the fatty acid sodium salt has an HLB value of 12 or more.

3. The ink jet recording apparatus according to claim 1, wherein the fatty acid has a surface tension lower than the critical surface tension of cellulose at 20° C.

4. The ink jet recording apparatus according to claim 1, wherein the fatty acid forms a film on a surface of the water-based ink and retards the evaporation of water.

* * * * *